United States Patent Office 3,210,121
Patented Oct. 5, 1965

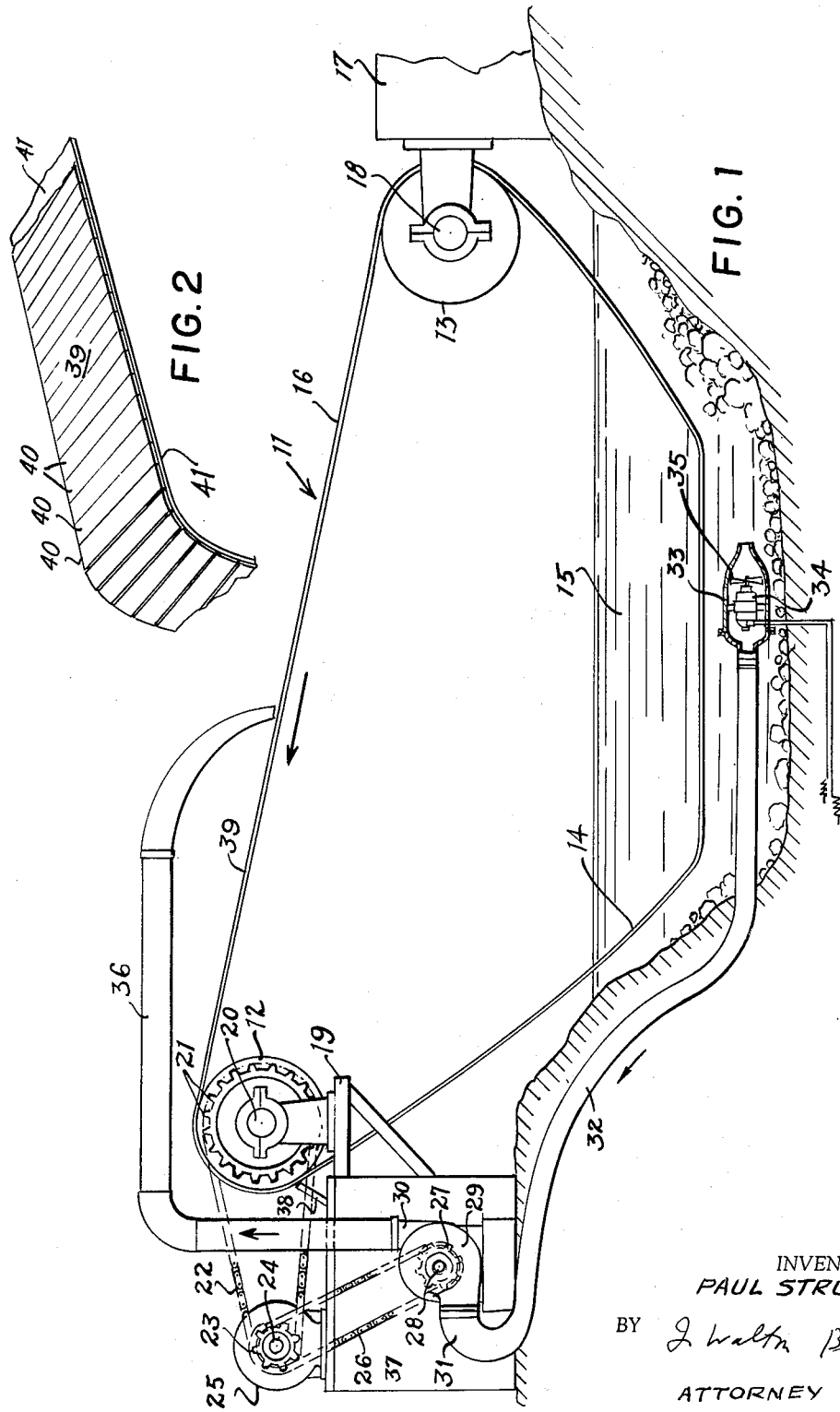

3,210,121
METHOD AND APPARATUS FOR EXTRACTING MAGNETICALLY ATTRACTED MATERIAL
Paul Struven, 60 Sutton Place S., New York, N.Y.
Filed Aug. 22, 1962, Ser. No. 218,634
2 Claims. (Cl. 299—8)

This invention relates to a method of extracting magnetically attracted material and to apparatus for performing the same.

In various parts of the world geological formations exist which consist of a large quantity of siliceous material (generally sand) which are intermixed with a much smaller quantity of magnetically attracted material (which is generally elemental iron or magnetic oxide of iron). Intermixed with the magnetically attracted material, in many cases, are quantities of gold and silver, either in the elemental or combined states.

The geological formations referred to herein are either located in river beds or in deserts.

Heretofore it has been impossible to profitably refine such material since the cost of extracting the magnetically attracted material from the large quantity of siliceous material has been prohibitive. Previous attempts to extract such material by means of magnetic belts have been unsuccessful since the siliceous material would become intimately mixed with the magnetically attracted material and would soon cause the process to come to an end because the magnetically attracted material would no longer adhere to the belt. In addition the material removed from the belt would be so contaminated with siliceous material that the cost of refining the same would be prohibitve.

Furthermore no means were provided for breaking up the clumps of material in the geological formation so as to permit proper extraction.

Accordingly the instant invention has been constructed which avoids all of the disadvantages of the prior processes and permits simple extraction of the magnetically attracted material from the geological formation within which it occurs. The instant specification sets forth the best mode known to the inventor of carrying out the instant invention but it is pointed out that the specific construction and method shown herein are for illustrative purposes and for purposes of example only. Various changes and modifications may obviously be made without departing from the spirit and scope of this invention.

The invention will now be further described by reference to the accompanying drawings which are made a part of this specification.

FIG. 1 is a side view of an apparatus utilized to carry out the method of this invention.

FIG. 2 is a detail view of the magnetic belt means employed in the apparatus of FIG. 1.

Figure 3:
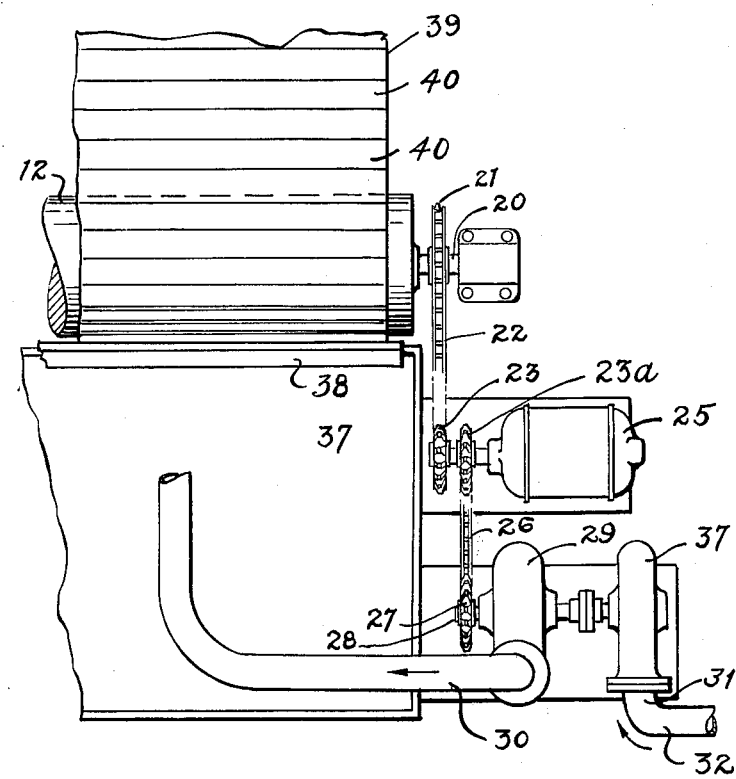
FIG. 3 is a top view of the apparatus shown in FIG. 1.

Referring now to the form of the apparatus herein as set forth in the drawings a continuous magnetic belt 11 is disposed between a pair of pulleys 12 and 13. A portion 14 of belt 11 extends into the geological formation 15 (which here is the bed of a stream) while another portion 16 of belt 11 extends above said geological formation 15. Pulley 13 is supported by support 17 which bears shaft 18 about which pulley 13 rotates. Pulley 12 is supported by support 19 which bears shaft 20 upon which pulley 12 rotates. Pulley 12 bears teeth 21 thereupon which mesh with chain 22 which in turn mesh with sprocket 23 which is driven by shaft 24 of motor 25. Motor 25 is also supported upon support 19.

Chain 26 is driven by sprocket 23 and is connected with sprocket 27 which rotates upon shaft 28 and operates suction member 29 which is formed with an end 30 and portion 31. Conduit 32 joins portion 31 of suction member 29 with swirl member 33 which is located within the geological formation 15. Motor 34 drives impeller 35 which is located within swirl 33. Conduit 36 extends from one end 30 of suction member 29 into spaced relationship with portion 16 of belt 11.

A hopper 37 is provided to collect the material extracted and scraping means 38 are provided in justaposition with one side 39 of belt member 11.

FIGURE 2 shows an enlarged detail view of belt 11 and it is noted that a number of magnetic members 40 are spaced in side by side relationship upon a flexible non-magnetic member (such as various types of plastic). Thus magnetism is applied to only one side of belt 11.

With the foregoing specific description the operation of the instant invention will now be explained.

Assuming that the device is utilized in a river bed motor 25 and motor 34 are actuated thus causing air movement to occur through conduit 32 and also through conduit 36 in the direction of the arrows shown in the drawings. This air movement causes material to be sucked out of the geological formation through conduits 32 and 36 and deposited upon the magnetic side of belt 11 since conduit 36 is normally disposed in spaced relationship with this side of belt 11. It is noted that this disposition takes place upon the portion of belt 11 which is suspended outside of the geological formation. Since belt 11 is constantly moving a continuous line of material sucked from the geological formation is deposited upon the aforesaid portion. It is further noted that belt 11 also travels through the geological formation and magnetically attracted material will also adhere to the said belt. The adherence of the magnetically attracted material to belt 11 is also produced by reason of the magnetic elements 40 located upon side 39 of belt 11. The movement of gas and material and the movement of the belt itself cause the non-magnetically attracted material to fall off the belt so that when the portion of the belt bearing the magnetically attracted material reach the area of scraper 38 it is contaminated very little with unwanted material. The swirl suction means and impelling means break up the formation so that the material reaching belt 11 is in relatively finely divided form.

When hopper 37 contains sufficient extracted material the material is then transferred to a refinery and further processed.

I claim:
1. Apparatus for removing magnetically attracted material from a geological formation containing said material intermixed with a quantity of other material comprising, in combination and in operative relationship,
   (a) suction swirl means and impelling means operatively connected thereto adapted to be placed within said geological formation,
   (b) continuous magnetic belt means partially suspended outside said geological formation and adapted to pass therethrough,
   (c) conducting means for the material sucked from said geological formation by said suction means spaced from an outside portion of said magnetic belt means,
   (d) mechanical removal means at an outside portion of said belt means,
   (e) hopper means operatively connected with said mechanical removal means.

2. Apparatus for removing magnetically attracted material from a geological formation containing said material intermixed with a quantity of other material comprising, in combinaiton and in operative relationship,
   (a) a swirl member normally lying within the geological formation, (b) a suction impeller adjacent said swirl member and operatively connected thereto,
(c) means driving said impeller,
(d) a second suction member having a suction end and a pressure end,
(e) first conduit means connecting said swirl member with the suction end of said second suction member,
(f) means driving said second suction member,
(g) a continuous magnetic belt member suspended outside and above said geological formation and adapted to pass through said formation,
(h) means supporting and driving said belt member,
(i) second conduit means connected to the pressure end of said air movement means and extending into spaced relationship with outside portio of said magnetic belt,
(j) mechanical removal means at an outside portion of said metallic belt,
(k) hopper means operatively connected with said mechanical removal means.

References Cited by the Examiner
UNITED STATES PATENTS

| | | | |
|---|---|---|---|
| 687,053 | 11/01 | McKnight | 209—218 |
| 1,270,142 | 6/18 | Gage | 262—2.1 |
| 1,804,998 | 5/31 | McCracken | 209—218 |
| 2,291,042 | 7/42 | Kennedy | 209—218 X |
| 2,786,575 | 3/57 | Roberts | 209—218 X |

CHARLES E. O'CONNELL, *Primary Examiner.*
BENJAMIN HERSH, *Examiner.*